United States Patent
Chen et al.

(10) Patent No.: US 10,082,959 B1
(45) Date of Patent: Sep. 25, 2018

(54) MANAGING DATA PLACEMENT IN STORAGE SYSTEMS

(75) Inventors: Xiangping Chen, Shrewsbury, MA (US); Dennis Thomas Duprey, Raleigh, NC (US); Thomas E. Linnell, Northborough, MA (US); Qin Tao, Hopkinton, MA (US)

(73) Assignee: EMC IP Holding Company LLC, Hopkinton, MA (US)

(*) Notice: Subject to any disclaimer, the term of this patent is extended or adjusted under 35 U.S.C. 154(b) by 589 days.

(21) Appl. No.: 13/338,140

(22) Filed: Dec. 27, 2011

(51) Int. Cl.
*G06F 12/00* (2006.01)
*G06F 3/06* (2006.01)

(52) U.S. Cl.
CPC .......... *G06F 3/0608* (2013.01); *G06F 3/0634* (2013.01); *G06F 3/0685* (2013.01)

(58) Field of Classification Search
CPC ..... G06F 3/0608; G06F 3/0634; G06F 3/0685
USPC ............................................. 711/114
See application file for complete search history.

(56) References Cited

U.S. PATENT DOCUMENTS

| 7,631,155 | B1 * | 12/2009 | Bono et al. ................... 711/156 |
| 8,898,394 | B2 * | 11/2014 | Kondo et al. ................. 711/143 |
| 2011/0167236 | A1 * | 7/2011 | Orikasa et al. ............... 711/165 |

* cited by examiner

*Primary Examiner* — Kalpit Parikh
(74) *Attorney, Agent, or Firm* — Deepika Bhayana; Jason Reyes; Krishnendu Gupta

(57) ABSTRACT

A method is used in managing data placement in storage systems. A portion of an allocated storage space is identified in a data storage system for managing data placement. The allocated storage space includes first and second set of slices. The first set of slices associated with the portion of the allocated storage space in the data storage system is identified. Data of the first set of slices is transferred to the second set of slices of the allocated storage space in the data storage system. The first set of slice is removed from the allocated storage space in the data storage system.

14 Claims, 10 Drawing Sheets

MANAGING DATA PLACEMENT IN STORAGE SYSTEMS

BACKGROUND

Technical Field

This application relates to managing data placement in storage systems.

Description of Related Art

A traditional storage array (herein also referred to as a "data storage system", "disk storage array", "disk array", or simply "array") is a collection of hard disk drives operating together logically as a unified storage device. Storage arrays are designed to store large quantities of data. Storage arrays typically include one or more storage array processors (SPs), for handling requests for allocation and input/output (I/O) requests. An SP is the controller for and primary interface to the storage array.

A storage array may be thought of as a system for managing a large amount of a resource, i.e., a large number of disk drives. Management of the resource may include allocation of a portion of the resource in response to allocation requests. In the storage array example, portions of the storage array may be allocated to, i.e., exclusively used by, entities that request such allocation.

The administrator of a storage array may desire to operate the array in a manner that maximizes throughput and minimizes response time. In general, performance of a storage array may be constrained by both physical and temporal constraints. Examples of physical constraints include bus occupancy and availability, excessive disk arm movement, and uneven distribution of load across disks. Examples of temporal constraints include bus bandwidth, bus speed, spindle rotational speed, serial versus parallel access to multiple read/write heads, and the size of data transfer buffers.

Large storage arrays today manage many disks that are not identical. Storage arrays use different types of disks and group the like kinds of disks into tiers based on the performance characteristics of the disks. A group of fast but small disks may be a fast tier (also referred to as "higher tier" or "high tier"). A group of slow but large disks may be a slow tier (also referred to as "lower tier" or "low tier"). It may be possible to have different tiers with different properties or constructed from a mix of different types of physical disks to achieve a performance or price goal. Storing often referenced, or hot, data on the fast tier and less often referenced, or cold, data on the slow tier may create a more favorable customer cost profile than storing all data on a single kind of disk.

A storage tier may be made up of different types of disks, i.e., disks with different redundant array of inexpensive disks (RAID) levels, performance and cost characteristics. In the industry there have become defined several levels of RAID systems. RAID (Redundant Array of Independent or Inexpensive Disks) parity schemes may be utilized to provide error detection during the transfer and retrieval of data across a storage system. The first level, RAID-0, combines two or more drives to create a larger virtual disk. In a dual drive RAID-0 system one disk contains the low numbered sectors or blocks and the other disk contains the high numbered sectors or blocks, forming one complete storage space. RAID-0 systems generally interleave the sectors of the virtual disk across the component drives, thereby improving the bandwidth of the combined virtual disk. Interleaving the data in that fashion is referred to as striping. RAID-0 systems provide no redundancy of data, so if a drive fails or data becomes corrupted, no recovery is possible short of backups made prior to the failure.

RAID-1 systems include one or more disks that provide redundancy of the virtual disk. One disk is required to contain the data of the virtual disk, as if it were the only disk of the array. One or more additional disks contain the same data as the first disk, providing a "mirror" of the data of the virtual disk. A RAID-1 system will contain at least two disks, the virtual disk being the size of the smallest of the component disks. A disadvantage of RAID-1 systems is that a write operation must be performed for each mirror disk, reducing the bandwidth of the overall array. In a dual drive RAID-1 system, the first disk and the second disk contain the same sectors or blocks, each disk holding exactly the same data.

RAID-2 systems provide for error correction through hamming codes. The component drives each contain a particular bit of a word, or an error correction bit of that word. RAID-2 systems automatically and transparently detect and correct single-bit defects, or single drive failures, while the array is running. Although RAID-2 systems improve the reliability of the array over other RAID types, they are less popular than some other systems due to the expense of the additional drives, and redundant onboard hardware error correction.

RAID-4 systems are similar to RAID-0 systems, in that data is striped over multiple drives. For example, the storage spaces of two disks are added together in interleaved fashion, while a third disk contains the parity of the first two disks. RAID-4 systems are unique in that they include an additional disk containing parity. For each byte of data at the same position on the striped drives, parity is computed over the bytes of all the drives and stored to the parity disk. The XOR operation is used to compute parity, providing a fast and symmetric operation that can regenerate the data of a single drive, given that the data of the remaining drives remains intact.

RAID-3 systems are essentially RAID-4 systems with the data striped at byte boundaries, and for that reason RAID-3 systems are generally slower than RAID-4 systems in most applications. RAID-4 and RAID-3 systems therefore are useful to provide virtual disks with redundancy, and additionally to provide large virtual drives, both with only one additional disk drive for the parity information. They have the disadvantage that the data throughput is limited by the throughput of the drive containing the parity information, which must be accessed for every read and write operation to the array.

RAID-5 systems are similar to RAID-4 systems, with the difference that the parity information is striped over all the disks with the data. For example, first, second, and third disks may each contain data and parity in interleaved fashion. Distributing the parity data generally increases the throughput of the array as compared to a RAID-4 system. RAID-5 systems may continue to operate though one of the disks has failed. RAID-6 systems are like RAID-5 systems, except that dual parity is kept to provide for normal operation if up to the failure of two drives.

Combinations of RAID systems are also possible. For example, a four disk RAID 1+0 system provides a concatenated file system that is also redundant. The first and second disks are mirrored, as are the third and fourth disks. The combination of the mirrored sets forms a storage space that is twice the size of one individual drive, assuming that all four are of equal size. Many other combinations of RAID systems are possible.

Data storage systems, such as disk drives, disk storage arrays, network storage devices, storage area networks, and the like, are called upon to store and manage a significant amount of data (e.g., gigabytes, terabytes, petabytes, etc.) that is written and read by many users. For example, a traditional storage array may include a collection of hard disk drives operating together logically as a unified storage device. Storage arrays are typically used to provide storage space for a plurality of computer file systems, databases, applications, and the like. For this and other reasons, it is common for physical storage arrays to be logically partitioned into chunks of storage space, called logical units, or LUs. This allows a unified storage array to appear as a collection of separate file systems, network drives, and/or volumes.

Presently, there is a trend toward the use of larger operating systems, larger applications or programs, and larger file sizes. Understanding this trend, a storage administrator is likely to request the provisioning (i.e., allocation) of a larger portion of storage space than is currently required for an operating system, for example, with the expectation that the space requirements will grow with upgrades, bug-fixes, the inclusion of additional features, and the like. However, a problem of underuse typically arises when the amount of storage space is fully provisioned and allocated to, but is not used by, an operating system, program, process, or user. In this scenario, the disk storage space is unused by the entity that requested its allocation and is also rendered unavailable for use by any other entity. In such cases, the unused space cannot be simply given back to a common storage pool where it may become accessible to other users. For example, a database installation may require many terabytes of storage over the long term even though only a small fraction of that space may be needed when the database is first placed into operation. In short, the large storage space may eventually be needed, but it is not known exactly when the entire space will be required. In the meantime, the allocated storage space lies unused by the requested user and may not be utilized by any other user.

In recognition of the fact that more storage space may be provisioned for operating systems, programs, and users than can actually be used at first, the concept of a sparsely populated logical unit (LU), such as a mapped LUN (e.g., thin logical unit (TLU), direct logical unit (DLU)), was developed. Unlike the more traditional fully allocated logical unit, which is created by fully provisioning and an entire initial amount of storage area, a sparsely populated logical unit is provisioned at creation but is not allocated any physical storage until the storage is actually needed. Specifically, a TLU resolves this problem by allocating the storage space (e.g., making the memory space physically available) as it is needed when (or shortly before) data is written to the TLU. A TLU is created from a common pool of physical space and starts with minimal amount of physical space. As the application that is using the TLU starts to demand more storage, the TLU incrementally requests the storage space from the common storage pool in portions referred to as slices.

Accordingly, there exists a need for systems, methods, and computer readable media for efficiently managing data placement in storage systems.

SUMMARY OF THE INVENTION

A method is used in managing data placement in storage systems. A portion of an allocated storage space is identified in a data storage system for managing data placement. The allocated storage space includes first and second set of slices. The first set of slices associated with the portion of the allocated storage space in the data storage system is identified. Data of the first set of slices is transferred to the second set of slices of the allocated storage space in the data storage system. The first set of slice is removed from the allocated storage space in the data storage system.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
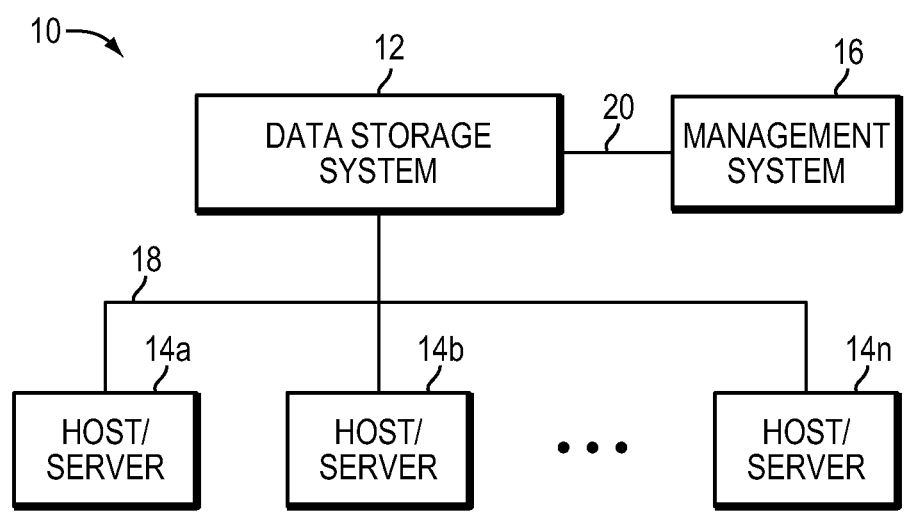
FIG. 1 is an example of an embodiment of a computer system that may utilize the techniques described herein.

Described below is a technique for use in managing data placement in storage systems, which technique may be used to provide, among other things, identifying a portion of an allocated storage space in a data storage system for managing data placement, where the allocated storage space includes first and second set of slices, identifying the first set of slices associated with the portion of the allocated storage space in the data storage system, transferring data of the first set of slices to the second set of slices of the allocated storage space in the data storage system, and removing the first set of slices from the allocated storage space in the data storage system.

A storage pool may be a collection of disks, which may include disks of different types. Storage pools may further be subdivided into slices; for example a 1 GB slice may be the allocation element for a logical unit. As well, a pool may be used synonymously with a storage tier. That is, both a storage tier and a pool may have storage devices of different performance capabilities and costs. As well, both may contain slices (also referred to as "data slices"). A slice may be considered the smallest element that can be tracked and moved. It may be advantageous to store the hot or most accessed data on the devices within the storage pool with the best performance characteristics while storing the cold or least accessed data on the devices that have slower performance characteristics. This can lead to a lower cost system having both faster and slower devices that can emulate the performance of a more expensive system having only faster storage devices.

A storage tier or a storage pool may be a collection of storage containers. A storage container may be a unit of storage including a set of storage extents. A storage extent is a logical contiguous area of storage reserved for a user requesting the storage space. For example, a storage tier may include three storage containers, each storage container including a set of disks and the set of disk in each storage container having different RAID levels.

A disk may be a physical disk within the storage system. A LUN may be a logical unit number which is an identifier for a Logical Unit. Each slice of data may have a mapping on the location of the physical drive where it starts and ends.

Slices are allocated to LUNs in a storage pool as "best-fit" at initial allocation time. In at least some cases, since the I/O load pattern of a slice is not known at initial allocation time, conventionally the performance capability of slice storage allocated may be too high or too low for effective data access on a slice. Furthermore, a data access pattern tends to change over time. Older data is accessed less frequently and therefore in at least many cases does not require storage with higher performance capability. Temperature of each storage slice is an indication of hotness of a slice, in other words, frequency and recency of slice I/Os. Better overall system performance can be achieved by placing hot slices to higher tier and cold slices to lower tier.

Slice relocation (herein also referred to as a "data relocation" or "data migration") is a process of determining optimal or near optimal data placement among storage objects (e.g., storage tier, RAID group) based on I/O load of the storage objects. Slice relocation helps provide a way to determine respective preferable or best storage locations of data slices within a LUN in a storage pool, and to construct a slice relocation candidate list to move slices from their current locations to the respective preferable or best locations. Data migration, i.e., the moving of data from one storage element to another, may be performed at the LUN level or at the slice level. Data migration at the slice level may be performed by copying the data of a slice and then updating an address map of the slice with the new location of the slice.

Generally, a storage pool is a collection of storage that is provisioned for a logical unit such as mapped logical unit (MLU) (also referred to as "TLU" or "virtual LUN"). A storage pool may include one or more storage tiers such that each storage tier includes storage of similar performance characteristics. Further, storage within a storage pool may be apportioned into data slices such that one or more data slices are provisioned to a mapped LU dynamically. As used herein, a mapped LU refers to a logical portion of storage space that represent contiguous and/or non-contiguous physical storage space, where mapping allows for physical storage space to be dynamically linked together at a time of use into a logically contiguous address space.

Although a TLU enables a user to avoid allocating unnecessary storage space from a common storage pool, there are still some instances where the TLU may comprise allocated areas of storage space (i.e., allocated slices) that are not being used. Notably, the TLU may be subjected to certain data storage optimization operations, such as a logical unit number (LUN) shrink, a LUN compression, or a LUN zeroing operation. In general, these operations can free up storage space in the TLU, thereby creating unused allocated slices. In many cases, this unused storage space cannot simply be given back to the common storage pool and allocated to other users. Thus, the use of these data storage optimization operations can result in the inefficient use of storage space within the TLU. Such a problem remains until the unused allocated slices in the TLU are eventually utilized (e.g., written to).

Conventionally, in case a user (e.g. a storage administrator) choose to reclaim a portion of storage from a storage pool that is provisioned for mapped LUs, the user must relocate entire data from the storage pool to another storage pool. Thus, in such a conventional system, a user may add a storage device to a storage pool but can not remove the storage device from the storage pool without having to manually relocate entire data of the storage pool to another storage pool, destroy the storage pool, and create a new storage pool that does not include the storage device. Further, in such a conventional case, a user may need to reclaim a portion of a storage pool based on any one of the number of use case scenarios such as the user may need to reconfigure a storage pool by reducing the storage capacity of the storage pool, or a user may choose to change the RAID configuration of the storage pool. In such a conventional system, when a storage device (e.g., a disk drive) is configured in a storage pool, a user may store useful data on the storage device. Thus, in such a conventional case, the storage device may not be removed from the storage pool in order to reclaim a portion of storage space associated with the storage device from the storage pool. Further, in such a conventional case, the slice relocation process which migrates data from one portion of the storage pool to another storage pool in order to balance I/O load and improve performance may spread data across each RAID group and/or each disk drive of the storage pool. As a result, in such a conventional system, a portion of the storage pool associated with a storage device may not be reclaimed without having to migrate entire data stored in the storage pool to another storage pool.

By contrast, in at least some implementations in accordance with the technique as described herein, the use of managing data placement in storage systems enables a user to specify a portion of a storage pool for reclamation such that the slice relocation process may be used to relocate data from the portion of the storage pool to another portion of the storage pool without having to manually migrate entire data out of the storage pool. In at least one embodiment, when the slice relocation process starts migrating data from a portion of a storage pool, no storage space is allocated from that portion of the storage pool that is being reclaimed for a new data allocation request. Further, when data from the portion of the storage pool is migrated to other portions of the storage pool, a storage device corresponding to the portion of the storage pool becomes available as a free storage device and may be removed from the storage pool. Thus, the size of the storage pool may be reduced by the size of the storage device corresponding to the portion of the storage pool. As a result, in at least some embodiments, the storage pool may be reconfigured or a new storage device of different RAID type may be added to the storage pool. Thus, in at least some embodiments, a RAID group associated with a portion of a storage pool may be reclaimed as available storage and may optionally be added back to the same storage pool with different RAID configuration.

In at least some implementations in accordance with the current technique as described herein, the use of the managing data placement in storage systems technique can provide one or more of the following advantages: lowering storage costs by improving efficiency of the data storage system, improving I/O performance by distributing I/O load optimally or nearly optimally across storage devices of the storage pool, and reducing the amount of storage required in the data storage system by optimally or nearly optimally utilizing all slices of the storage pool.

In some embodiments, the current technique can be used to efficiently place data in storage systems in a case in which a storage pool needs to be reconfigured for isolating a fault within the storage pool or improving performance of the storage pool. Conventionally, each RAID group configured in a storage pool must be configured based on the same RAID type. Thus, in such a conventional system, configuring each RAID group of the storage pool causes inefficient use of storage resources such that a user may have to configure the RAID groups of the storage pool in a way which is inconsistent with best practices for improving performance and reliability of a storage system. Further, in such a conventional system, in order to change configuration of a storage pool in which each RAID group is of the same RAID type to include a RAID group of different type, entire data of the storage pool must be migrated out of the storage pool. By contrast, in at least one embodiment of the current technique, a storage pool may be configured to include RAID groups that are based on different RAID types. By contrast, in at least some implementations in accordance with the technique as described herein, a user is able to reclaim storage from a storage pool in order to change configuration of the storage pool without having to migrate entire data out of the storage pool. Further, in at least some embodiments, a user may efficiently manage data placement within a storage pool based on storage characteristics of the storage pool. For example, in at least one embodiment, if 80% of storage space of a storage pool is in use by a user for storing data and the remaining 20% of storage space is available as free storage, the user may reclaim the remaining 20% of storage space by managing placement of data efficiently such that a set of storage devices (such as disk drives, RAID groups) corresponding to the remaining 20% of the storage space may be reclaimed as free storage space by migrating data stored on the set of storage devices to another set of storage devices within the storage pool. Further, for example, in at least one embodiment, a new storage device (such as RAID group, disk drive) may be added to a storage pool, data from an existing storage device may be migrated to the new storage device, and the existing storage device may be replaced by another storage device.

Referring now to FIG. 1, shown is an example of an embodiment of a computer system that may be used in connection with performing the technique or techniques described herein. The computer system 10 includes one or more data storage systems 12 connected to host systems 14a-14n through communication medium 18. The system 10 also includes a management system 16 connected to one or more data storage systems 12 through communication medium 20. In this embodiment of the computer system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage systems 12, and may also communicate with other components (not shown) that may be included in the computer system 10. In at least one embodiment, the communication medium 20 may be a LAN connection and the communication medium 18 may be an iSCSI or fibre channel connection.

Each of the host systems 14a-14n and the data storage systems 12 included in the computer system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 20, a variety of different communication protocols may be used such as SCSI, Fibre Channel, iSCSI, FCoE and the like. Some or all of the connections by which the hosts, management system, and data storage system may be connected to their respective communication medium may pass through other communication devices, such as a Connectrix or other switching equipment that may exist such as a phone line, a repeater, a multiplexer or even a satellite. In at least one embodiment, the hosts may communicate with the data storage systems over an iSCSI or fibre channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16. The manager may also configure a data storage system, for example, by using management software to define a logical grouping of logically defined devices, referred to elsewhere herein as a storage group (SG), and restrict access to the logical group.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN, in an embodiment using the techniques herein. It should also be noted that an embodiment may include data storage arrays or other components from one or more vendors. In subsequent examples illustrated the techniques herein, reference may be made to a single data storage array by a vendor, such as by EMC Corporation of Hopkinton, Mass. However, as will be appreciated by those skilled in the art, the techniques herein are applicable for use with other data storage arrays by other vendors and with other components than as described herein for purposes of example.

An embodiment of the data storage systems 12 may include one or more data storage systems. Each of the data storage systems may include one or more data storage devices, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12.

It should be noted that each of the data storage systems may operate stand-alone, or may also included as part of a storage area network (SAN) that includes, for example, other components such as other data storage systems.

Each of the data storage systems of element 12 may include a plurality of disk devices or volumes. The particular data storage systems and examples as described herein for purposes of illustration should not be construed as a limitation. Other types of commercially available data storage systems, as well as processors and hardware controlling access to these particular devices, may also be included in an embodiment.

Servers or host systems, such as 14a-14n, provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical volumes. The logical volumes may or may not correspond to the actual disk drives. For example, one or more logical volumes may reside on a single physical disk drive. Data in a single storage system may be accessed by multiple hosts allowing the hosts to share the data residing therein. A LUN (logical unit number) may be used to refer to one of the foregoing logically defined devices or volumes. An address map kept by the storage array may associate host system logical address with physical device address.

In such an embodiment in which element 12 of FIG. 1 is implemented using one or more data storage systems, each of the data storage systems may include code thereon for performing the techniques as described herein. In following paragraphs, reference may be made to a particular embodiment such as, for example, an embodiment in which element 12 of FIG. 1 includes a single data storage system, multiple data storage systems, a data storage system having multiple storage processors, and the like. However, it will be appreciated by those skilled in the art that this is for purposes of illustration and should not be construed as a limitation of the techniques herein. As will be appreciated by those skilled in the art, the data storage system 12 may also include other components than as described for purposes of illustrating the techniques herein.

The data storage system 12 may include any one or more different types of disk devices such as, for example, an ATA disk drive, FC disk drive, and the like. Thus, the storage system may be made up of physical devices with different physical and performance characteristics (e.g., types of physical devices, disk speed such as in RPMs), RAID levels and configurations, allocation of cache, processors used to service an I/O request, and the like.

Given the different performance characteristics, one or more tiers of storage devices may be defined. The physical devices may be partitioned into tiers based on the performance characteristics of the devices; grouping similar performing devices together. An embodiment using the techniques herein may define a hierarchy of multiple tiers. Conversely, the particular performance characteristics may be applied to a storage pool with or without the definition of tiers. The set of resources associated with or designated for use by a tier or grouping within a pool may be characterized as a dynamic binding in that the particular set of data storage system resources utilized by consumers in a tier may vary from time to time. A current configuration for the data storage system, static aspects of the current data storage system resources (e.g., types of devices, device storage capacity and physical device characteristics related to speed and time to access data stored on the device), and current workload and other dynamic aspects (e.g., actual observed performance and utilization metrics) of the data storage system may vary at different points in time.

An Auto-Tiering policy engine (PE) of the data storage system 12 examines a storage pool's storage configuration and temperatures of all slices in that storage pool, and generates a slice relocation list. The slice relocation list identifies slices to be relocated with respective destination information. In general, slices in a storage pool are matched to the most appropriate respective tiers based on their respective temperatures (e.g., hot, cold) and tier preferences (e.g., High, Low, Optimal). If a slice's current tier differs from its matching tier, the slice is listed in the relocation candidate list.

Figure 2A:
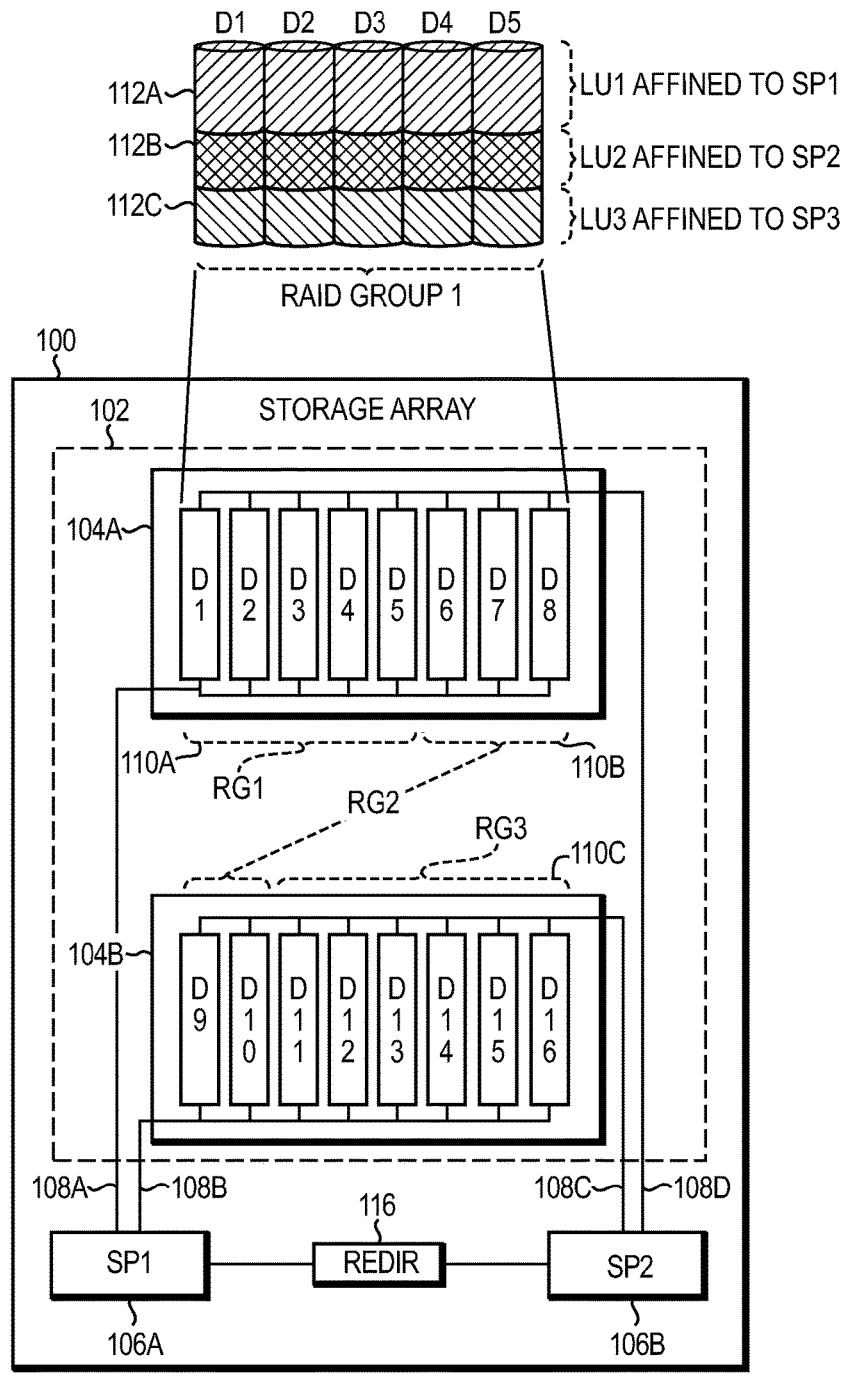
FIGS. 2A and 2B are an example of an embodiment of a computer system that may utilize the techniques described herein.
Figure 2B:
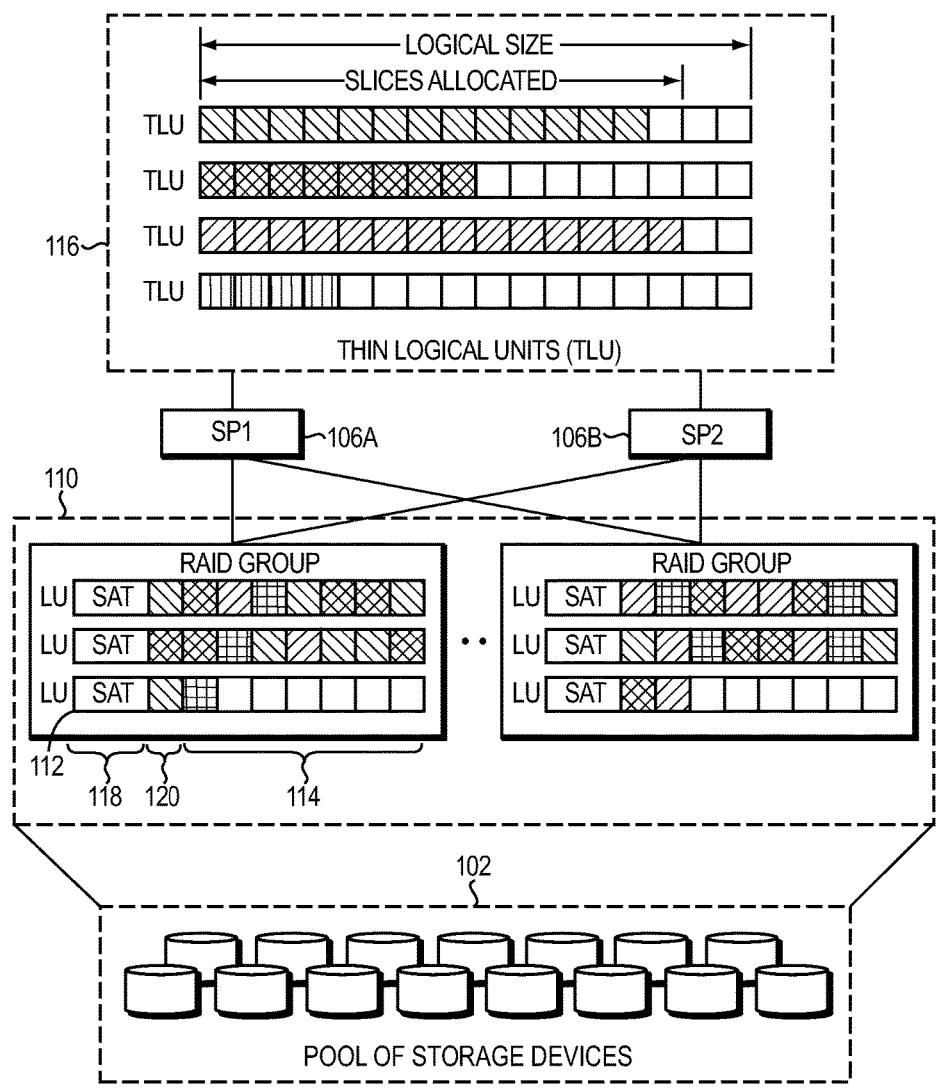

Referring to FIGS. 2A and 2B, shown are examples of an embodiment of a computer system that may be used in connection with performing the techniques described herein. FIG. 2A shows a storage system that comprises a storage array 12. Storage array 12 includes multiple storage devices 102, which are typically hard disk drives, but which may be tape drives, flash memory, flash drives, other solid state drives, or some combination of the above. Storage devices 102 may have various differences in capabilities based on physical characteristics of underlying storage media, e.g., flash memory may be extremely fast compared to tape storage which may be relatively large and cheap. As used herein, storage media may also be referred to as physical media. Storage media may include any of various computer readable media, e.g., hard disks, floppy disks, disks, tapes, discs, solid state memory, optical discs, and flash memory. In at least one embodiment, storage devices 102 may be organized into tiers or classes of storage based on characteristics of associated storage media. For example, flash-based storage device 102 may be tier 1 storage, hard disk-based storage device 102 may be tier 2 storage, and tape-based storage devices 102 may be tier 3 storage.

In at least one embodiment, the storage devices may be organized into multiple shelves 104, each shelf containing multiple devices 102. In the embodiment illustrated in FIG. 2A, storage array 12 includes two shelves, Shelf1 104A and Shelf2 104B; Shelf1 104A contains eight storage devices, D1-D8, and Shelf2 also contains eight storage devices, D9-D16. Storage array 12 may include one or more storage processors 106, for handling input/output (I/O) requests and allocations. Each storage processor 106 may communicate with storage devices 102 through one or more data buses 108. In at least one embodiment, storage array 12 contains two storage processors, SP1 106A, and SP2 106B, and each storage processor 106 has a dedicated data bus 108 for each shelf 104. For example, SP1 106A is connected to each storage device 102 on Shelf1 104A via a first data bus 108A and to each storage device 102 on Shelf2 104B via a second data bus 108B. SP2 106 is connected to each storage device 102 on Shelf1 104A via a third data bus 108C and to each storage device 102 on Shelf2 104B via a fourth data bus 108D. In this manner, each device 102 is configured to be connected to two separate data buses 108, one to each storage processor 106. For example, storage devices D1-D8 may be connected to data buses 108A and 108C, while storage devices D9-D16 may be connected to data buses 108B and 108D. Thus, each device 102 is connected via some data bus to both SP1 106A and SP2 106B. The configuration of storage array 12, as illustrated in FIG. 2A, is for illustrative purposes only, and is not considered a limitation of the current technique described herein.

In addition to the physical configuration, storage devices 102 may also be logically configured. For example, multiple storage devices 102 may be organized into redundant array of inexpensive disks (RAID) groups, or RGs 110, shown in FIG. 1A as RG1 110A, RG2 110B, and RG3 110C. Storage devices D1-D5 are organized into a first RAID group, RG1 110A, while storage devices D6-D10 are organized into a second RAID group, RG2 110B. Storage devices D11-D16 are organized into a third RAID group, RG3 110C. In at least one embodiment, a RAID group may span multiple shelves and/or multiple buses. For example, RG2 110B includes storage devices from both Shelf1 104A and Shelf2 104B.

Although RAID groups are composed of multiple storage devices, a RAID group may be conceptually treated as if it were a single storage device. As used herein, the term "storage entity" may refer to either a single storage device or a RAID group operating as a single storage device. RAID groups (RG) may be created or based on a various factors, including proximity of storage devices, utilization goals, capacity needs, physical characteristics of storage devices 102, and other factors. In at least one embodiment, RGs are based on tiers generally determined by physical characteristics of storage devices (e.g., fast, high quality devices D1-D5 may be tier 1 storage devices, and, as such, may be organized into a given RG 110). Such physical characteristics of storage devices for determining tiers may include but is not limited to capacity of storage device, access speed of storage device (e.g., revolution per minute (RPM) for disk-based media and throughput for solid state media), and type of storage device (e.g., flash, hard disk, and floppy). Further a RAID group may also include storage devices (e.g., disk drives) that are configured from different storage tiers.

In at least one embodiment, storage entities are associated with tiers or classes of storage. Storage entities may be further sub-divided into logical units. A single RAID group or individual storage device may contain one or more logical units. Each logical unit may be further subdivided into portions of a logical unit, referred to as "slices". As used herein, storage area refers to storage space of one or more storage entities in a storage system. Slices may be any size and may be associated with storage media from one or more storage entities. In at least one embodiment, slices are constant-sized portions of storage associated with one storage device 102, or a storage media therein, in storage array 12 (e.g., a 1 gigabyte (GB) slice from D2). In the embodiment illustrated in FIG. 2A, RG1, which includes storage devices D1-D5, is sub-divided into 3 logical units, LU1 112A, LU2 112B, and LU3 112C. Each LU is sub-divided into multiple slices. Further, a user may not access LUs (LU1 112A, LU2 112B, and LU3 112C) as the LUs are referred to as private LUs. However, a user may access a mapped LU which is created from slices of private LUs as described below herein. A mapped LU may also be referred to as a front end logical unit such that a user may allocate the mapped LU for provisioning storage.

FIG. 2B is a block diagram illustrating another view of a data storage system for managing data placement in a storage system according to an embodiment of the current technique described herein. In the simplified view shown in FIG. 2B, a pool of storage devices 102 are organized into multiple RAID groups 110, and each RAID group is further divided into a number of LUs from which slices 114 are allocated to one or more mapped LUs for use by users of storage array 12. As used herein, a mapped LU refers to a logical portion of storage space that represent contiguous and/or non-contiguous physical storage space, where mapping allows for physical storage space to be dynamically linked together at a time of use into a logically contiguous address space. Exemplary examples of mapped LUs may include thin logical units (TLUs) 116 and direct logical units (DLUs). A thin logical unit ("TLU") is a sparsely populated logical unit (LU) provisioned at creation but which is not allocated any storage until the storage is actually needed. A "direct logical unit" or "DLU" (also referred to as "direct mapped LUN") is a fully provisioned mapped LU with coarse mapping. Even though a DLU is seen as fully provisioned by a user, internally storage space is allocated on as needed basis. TLUs 116 may have a logical size that is larger than the actual storage size consumed by TLUs 116. The actual consumed size is determined by the number of slices actually allocated to the TLU 116. Thus, an amount of storage space presented to a host of a data storage system using a thin logical volume may be different than the amount of storage space actually allocated to the thin logical volume. The slices that are allocated to a mapped LUN may be physically located anywhere in storage array 100. As will be discussed in more detail below, these slices may be located more or less contiguously, but they may also be distributed more or less evenly across all physical resources, depending on the slice selection and allocation policy or algorithm. Other physical distributions are within the scope of the current technique claimed herein.

In at least one embodiment, storage processors 106A, 106B are responsible for allocating storage and maintaining information about how that allocated storage is being used. In one implementation of storage array 100, each logical unit 112 is associated with a slice allocation table (SAT) 118, which is used to record information about each slice 114, such as the TLU that is using the slice 114 and whether the slice is free or allocated. The SAT 118 may be stored in the logical unit 112, or it may be stored outside the logical unit 112 to which it is associated.

Figure 3:
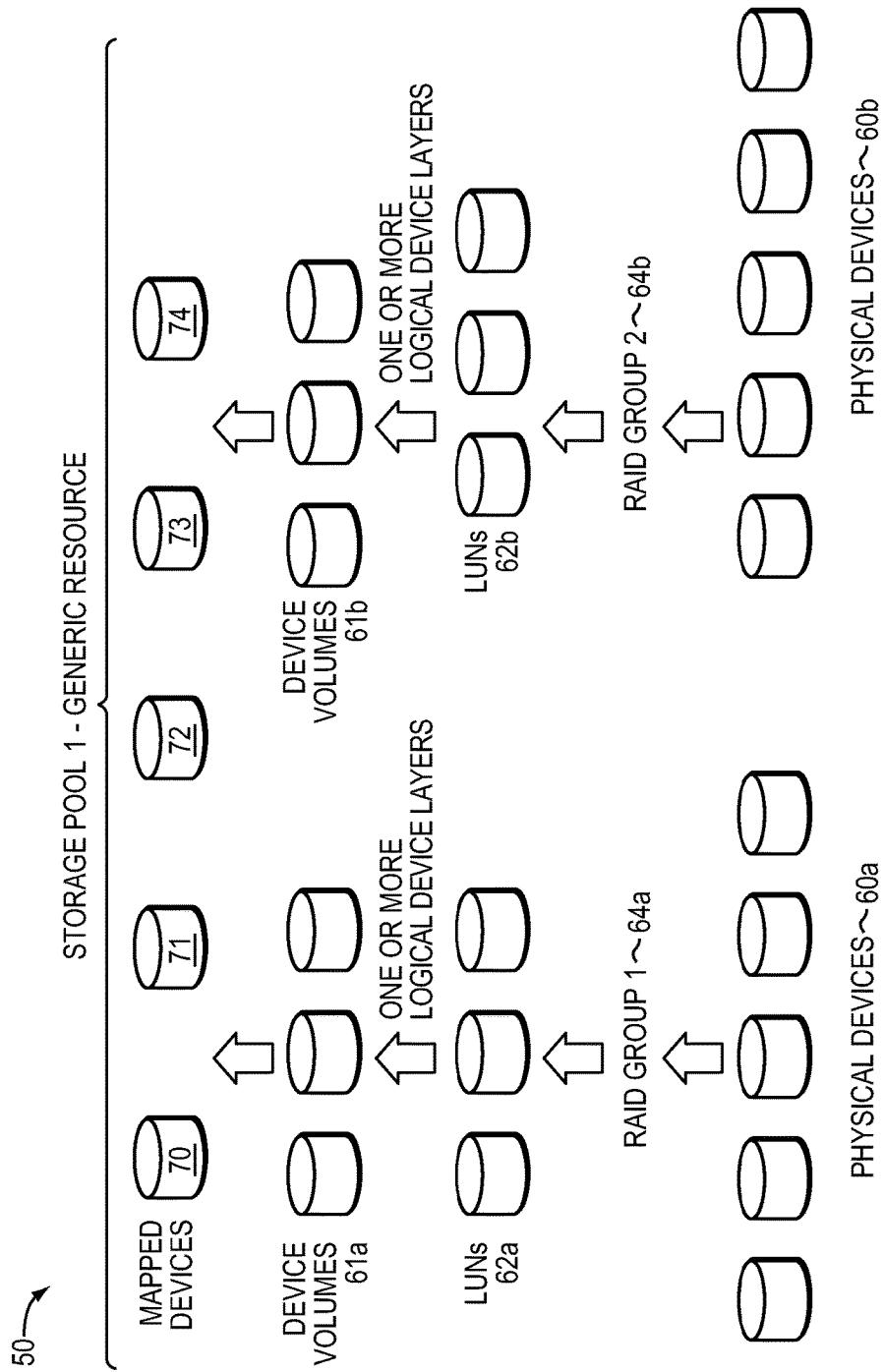
FIG. 3 is an example illustrating storage device layout.

Referring to FIG. 3, shown is an example representing how data storage system best practices may be used to form storage pools. The example 50 illustrates how storage pools may be constructed from groups of physical devices. For example, RAID Group 1 64a may be formed from physical devices 60a. The data storage system best practices of a policy may specify the particular disks and configuration for the type of storage pool being formed. For example, for physical devices 60a on a first data storage system type when forming a storage pool, RAID-5 may be used in a 4+1 configuration (e.g., 4 data drives and 1 parity drive). The RAID Group 1 64a may provide a number of data storage LUNs 62a. An embodiment may also utilize one or more additional logical device layers on top of the LUNs 62a to form one or more logical device volumes 61a. The particular additional logical device layers used, if any, may vary with the data storage system. It should be noted that there may not be a 1-1 correspondence between the LUNs of 62a and the volumes of 61a. In a similar manner, device volumes 61b may be formed or configured from physical devices 60b. The storage pool 1 of the example 50 illustrates two RAID groups being used to define a single storage pool although, more generally, one or more RAID groups may be used for form a storage pool in an embodiment using RAID techniques.

The data storage system 12 may also include one or more mapped devices 70-74. A mapped device (e.g., "thin logical unit", "direct logical unit") presents a logical storage space to one or more applications running on a host where different portions of the logical storage space may or may not have corresponding physical storage space associated therewith. However, the mapped device is not mapped directly to physical storage space. Instead, portions of the mapped storage device for which physical storage space exists are mapped to data devices such as device volumes 61a-61b, which are logical devices that map logical storage space of the data device to physical storage space on the physical devices 60a-60b. Thus, an access of the logical storage space of the mapped device results in either a null pointer (or equivalent) indicating that no corresponding physical storage space has yet been allocated, or results in a reference to a data device which in turn references the underlying physical storage space.

Figure 4A:
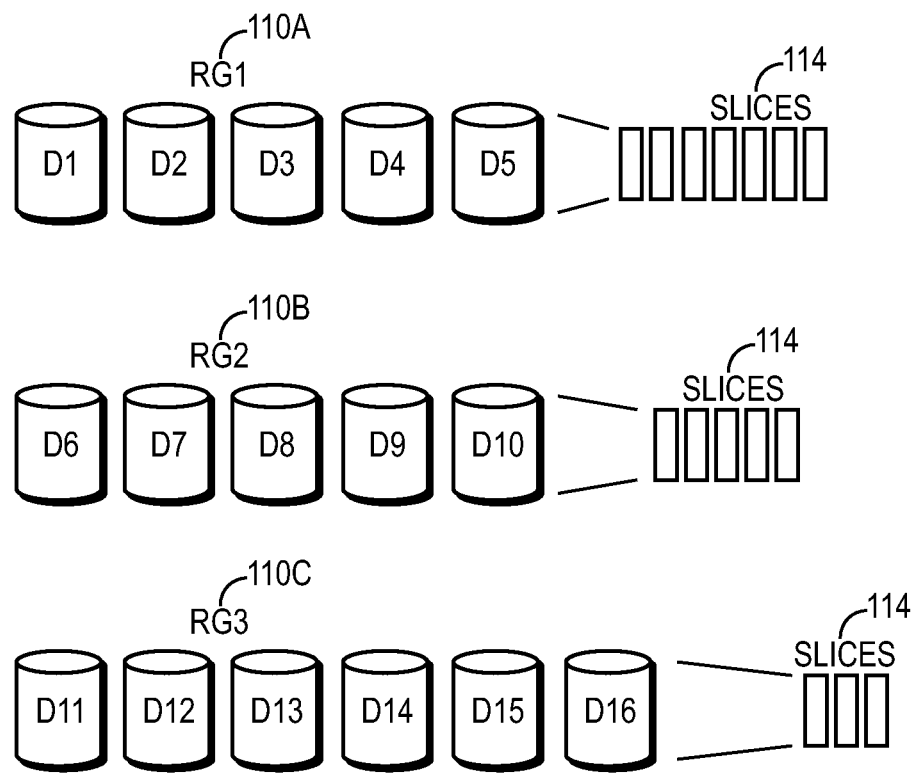
FIGS. 4A and 4B are examples illustrating storage device layout.

Referring to FIG. 4A, shown is a diagram illustrating an exemplary logical division of a storage of a data storage system into storage objects (such as RAID groups) for managing data placement in the data storage system that may be included in an embodiment using the techniques described herein. With reference also to FIGS. 2A and 2B, for example, storage entities 102 may refer to either a single storage device or a RAID group operating as a single storage device, may be further sub-divided into logical units. A single RAID group or individual storage device may contain one or more logical units (LUs) 112. However, RAID groups need not correspond to LUs and RAID groupings may be further divided into two or more LUs. In addition to RAID groups, each logical unit 112 may be further subdivided into portions of a logical unit, referred to as "slices" 114. Slices 114 may be allocated, de-allocated, re-allocated, reserved, or redistributed by a slice manger. A slice may be, for example, a 1 GB slice of data. However, the techniques described herein should not be construed as being limited to only slices of data; the techniques are equally applicable to other data chunk sizes, such as blocks, slivers (subset of slices), page, file or the like. The slice manager may be a software application or layer that is executed, at least in part, by one or more SPs 106. The slice manager may be responsible for implementing a slice allocation policy and/or algorithm. For example, the slice manager may receive slice allocation requests, and maintain relevant statistical information regarding slices.

Figure 4B:
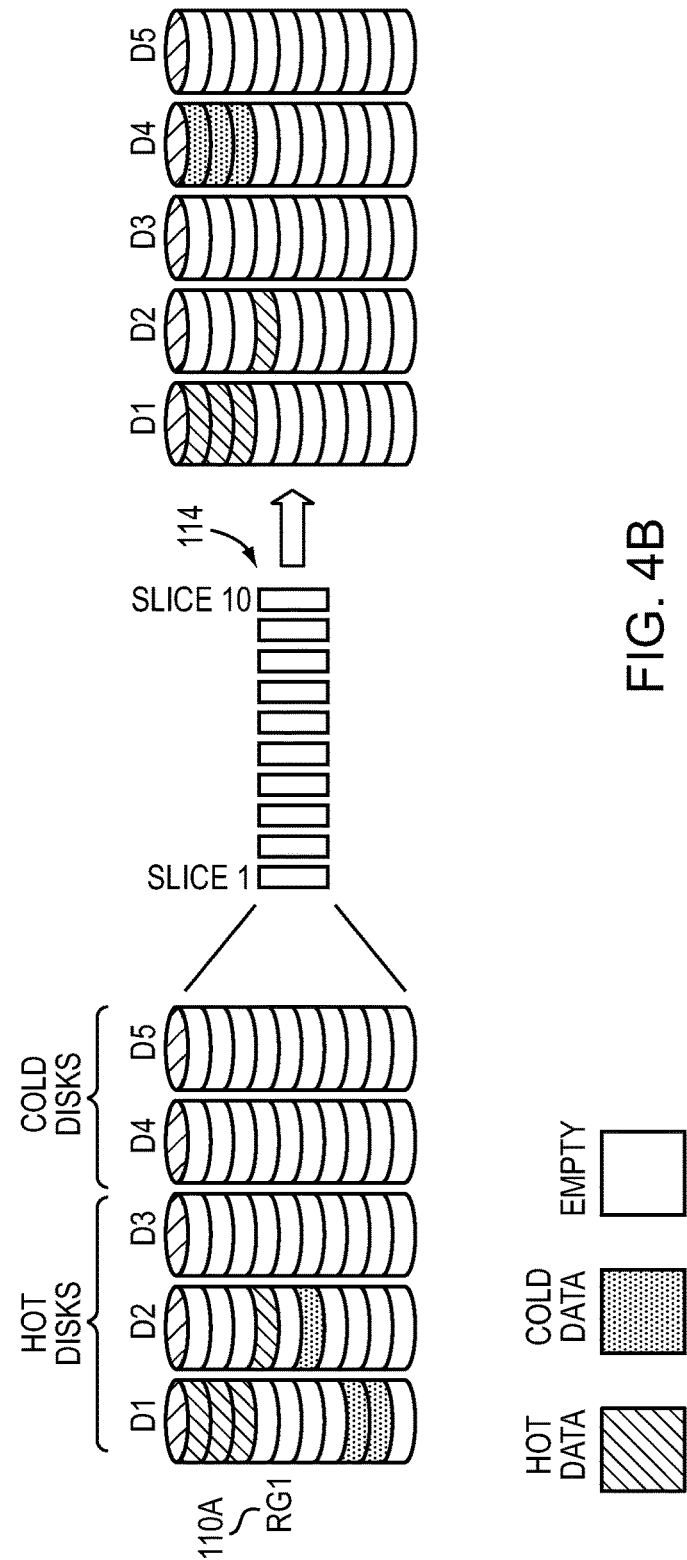

Referring to FIG. 4B, shown is a diagram illustrating another example of logical division of a storage of a data storage system into storage objects (such as RAID groups, storage devices, slices) for managing data placement in the data storage system that may be included in an embodiment using the techniques described herein.

In at least one embodiment, a collection of hard disk drives may be organized into RAID arrays. The collective data storage capacity of storage devices (e.g., RG1 110A) is represented by data storage space. The data storage space may be divided into portions, hereinafter referred to as slices 114 (e.g., SLICE1-SLICE10). In at least one embodiment of the current technique, for example, each slice 114 is approximately 1 gigabyte (GB) in size, but other sizes may be used. Slices 114 within the data storage space may be organized into logical units (LUs), which are commonly referred to as LUNs.

In an embodiment of the current technique, data storage systems that comprise storage devices of varied performance characteristics grouped into tiers can be managed in such a way as to migrate data from one portion of the storage pool to another portion of the storage pool. A particular embodiment may help achieve this migration by automatically migrating data among the tiers based on the "temperature" of the data and location of the data on storage devices. In general, temperature may correspond to, for example, how often and how recently the data is accessed. For example, hot data may refer to data that has been accessed recently and is accessed often, cold data may refer to data that has not been accessed recently and is not accessed often. Data temperature may be further segmented to include a warm data category that may include data that is less hot than hot data and/or less cold than cold data. Hence, warm data may refer to data that is accessed more often than cold data and less often that hot data. In general, in accordance with an embodiment of the current technique, hot data is migrated to faster (and typically more expensive) storage, and cold data is migrated to slower (and typically less expensive) storage. Warm data may be migrated to either type of storage and such storage may be configurable to be placed in a reduced power consumption state. Migration maybe accomplished by copying the data and changing the map entries for the logical addressed that were involved to reflect the new logical to physical association. Thus, hot data may be stored in disk drives indicated as hot disks and cold data may be stored in disk drives indicated as cold disks.

Additional details regarding slice relocation and tiered data storage arrays are disclosed in U.S. patent application Ser. No. 12/826,434, filed on Jun. 29, 2010 and entitled, "MANAGING MULTI-TIERED STORAGE POOL PROVISIONING" and U.S. patent application Ser. No. 12/824,816, filed on Jun. 28, 2010 and entitled, "METHODS, SYSTEMS, AND COMPUTER READABLE MEDIUM FOR TIER-BASED DATA STORAGE RESOURCE ALLOCATION AND DATA RELOCATION IN A DATA STORAGE ARRAY" which are incorporated by reference herein in their entireties.

Figure 5:
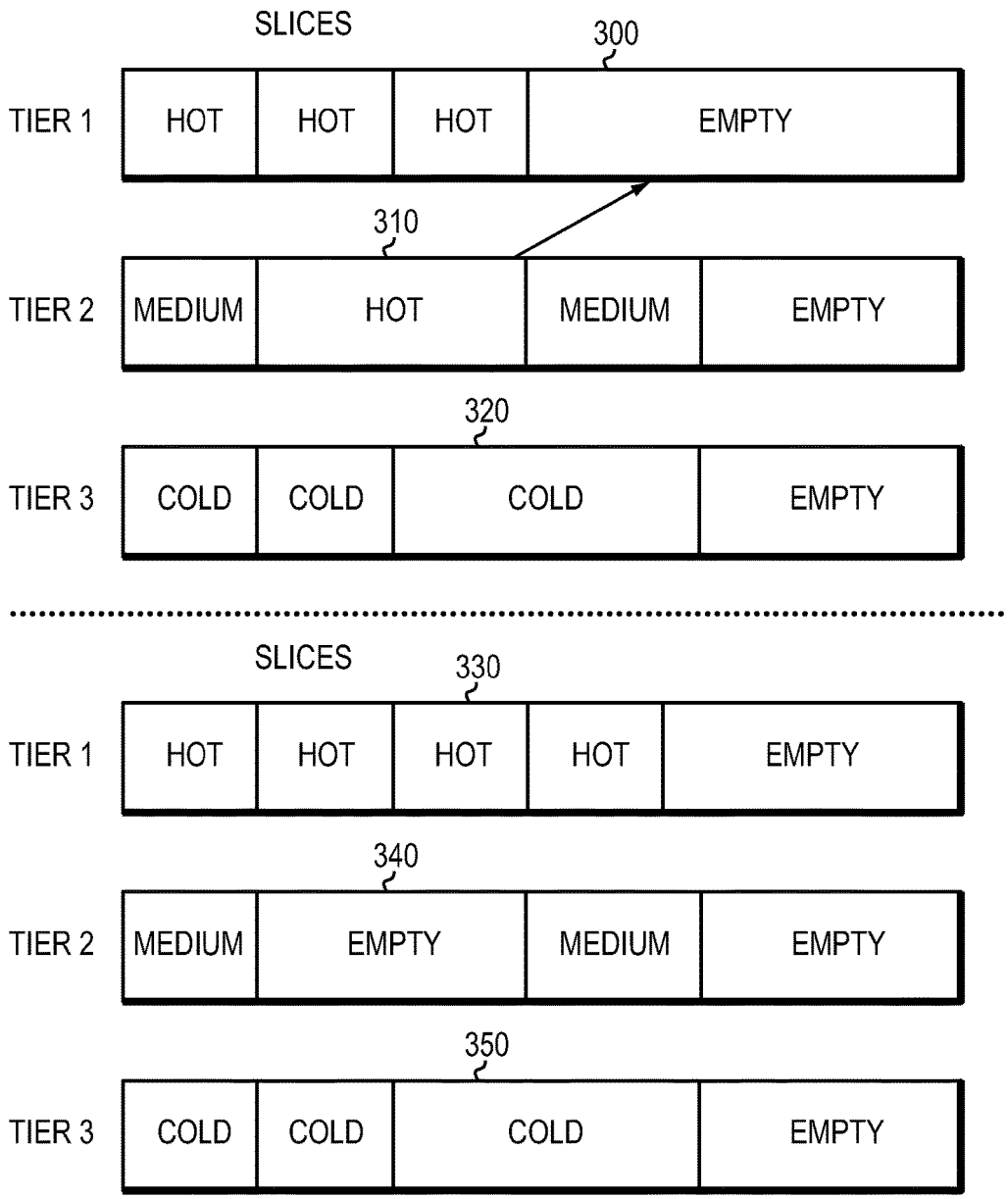
FIGS. 5-7 are block diagrams illustrating in more detail components that may be used in connection with techniques herein.

Referring now to FIG. 5 that illustrates a process of relocating data slices from a first storage tier of a storage pool to a second storage tier of the storage pool in a data storage system. In this figure, there are three storage tiers, Tier 1, Tier 2 and Tier 3. Each storage tier includes slices, such as slices 300, 310, and 320. As well, each slice has a temperature associated with it such as hot, cold, or medium. As well, some of the storage tier is also considered empty. Referring to the upper portion of the FIG. 5, there is a hot slice 310 in storage Tier 2. The temperature of a slice may be designated as a scalar or step value that is it may have a numerical equivalent such as 30 degrees or may simply be designated into a bucket, such as cold.

Also shown in the FIG. 5 is that Tier 1 has empty space 300. In this example, Tier 1 may have faster performance characteristics and a higher cost. Conversely, Tier 2 may have slower performance characteristics but a lower cost. This may be seen, for example, in the fact that there is more storage in Tier 2 than there is in Tier 1. Again, in the upper portion of the FIG. 5, it is shown that there is a hot slice 310 in Tier 2 that should be moved to Tier 1. In this example embodiment, as shown in the lower portion of FIG. 5, the hot slice is moved to Tier 1 leaving an empty space 340 in Tier 2.

Figure 6:
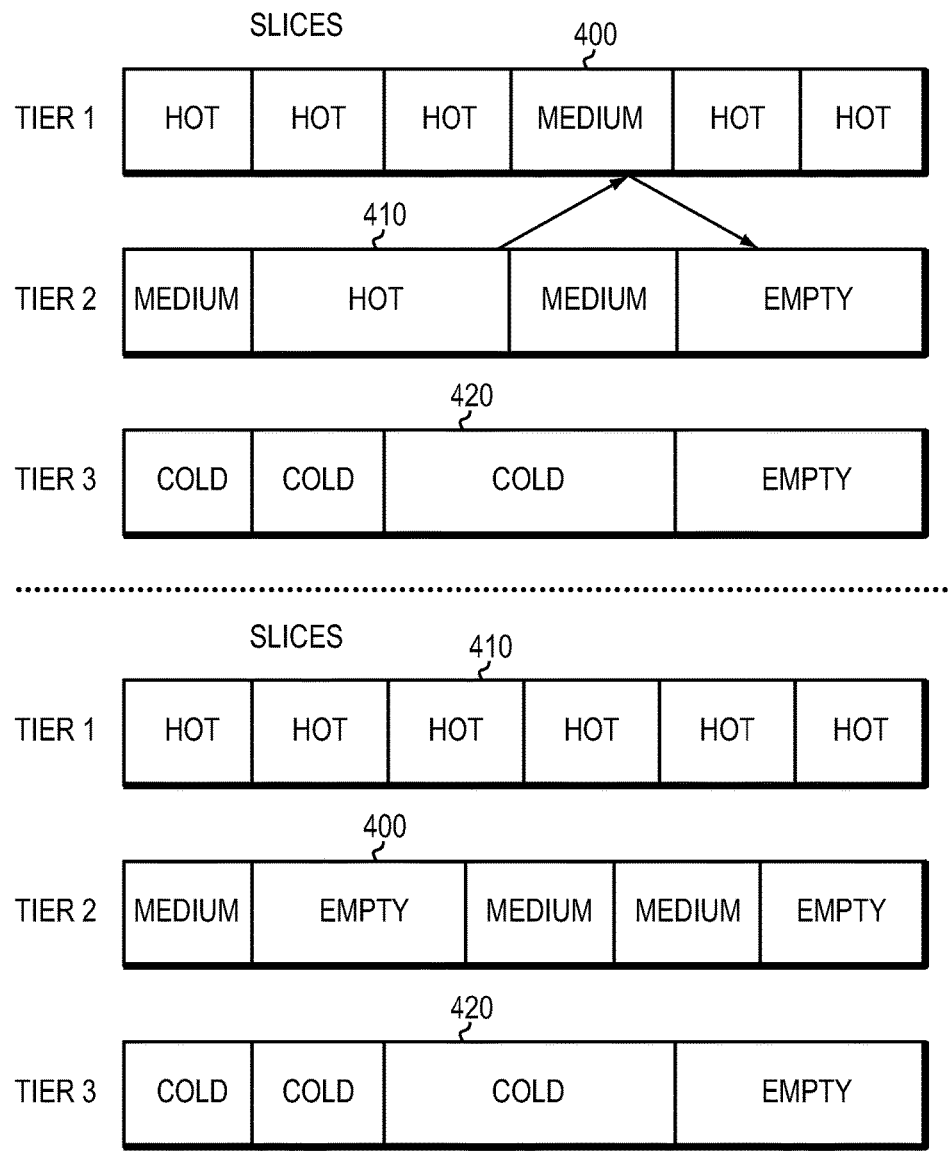

Referring now to FIG. 6 that illustrates a process of relocating data slices from a first storage tier of a storage pool to a second storage tier of the storage pool in a data storage system. In this embodiment, there is a hot slice 410 in Tier 2 and a medium slice 400 in Tier 1; however, Tier 1 has no space to accommodate an additional tier. Therefore, in this embodiment, the medium slice 400 on Tier 1 is migrated to Tier 2 and the hot slice 410 in Tier 2 is migrated to Tier 1. Note, that it was the need to migrate the hot slice 410 to Tier 1 that caused the medium slice 400 to be shifted to Tier 2. In this example, it may have been more effective to have the medium slice located in Tier 1. Also note that slices may change temperature based on data access requests. Therefore, a slice's temperature may rise or fall over time. The slice's temperature may be the result of any number of calculations based on data access or data write requests to that slice.

Figure 7:
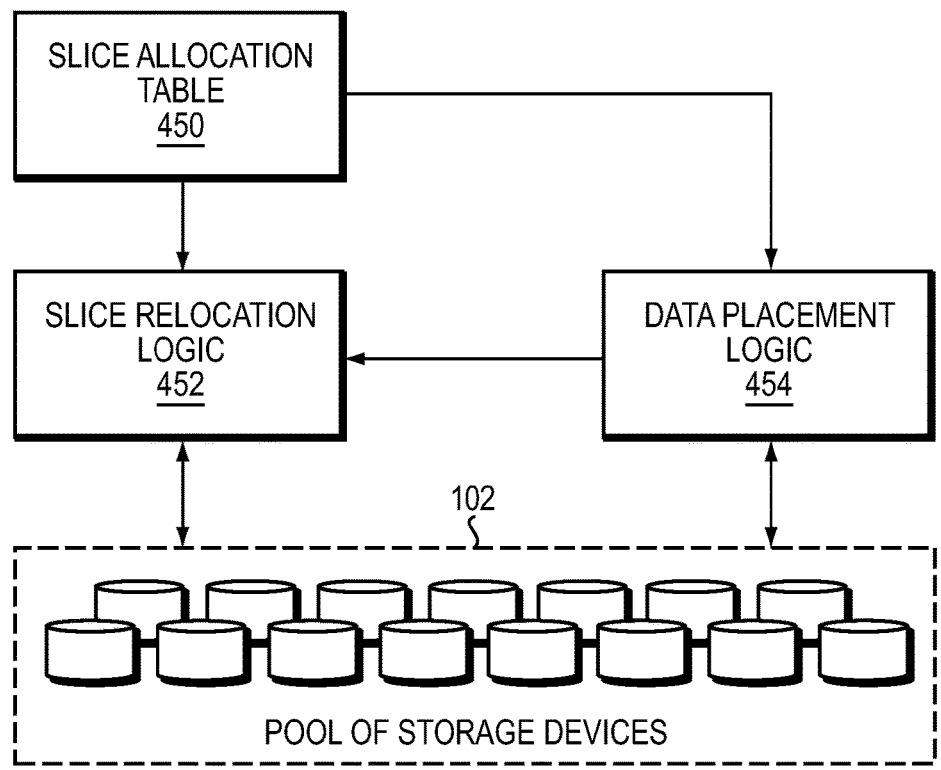

Referring to FIG. 7, shown is a more detailed representation of components that may be included in an embodiment using the techniques described herein. In at least some embodiments of the current technique, a storage pool may include one or more RAID groups. A RAID group may be associated with data devices, such as the physical devices 60a-60b discussed herein, so that, for example, there is one or more data devices for each RAID group, any portion of a data device for any portion of the pools of storage, and/or any combinations thereof. Further, data devices associated with a storage pool may have different characteristics, such as speed, cost, reliability, availability, security and/or other characteristics.

In at least one embodiment, slice relocation logic 452 (also referred to as "evacuation process") may transfer data from a slice of a logical unit of a storage pool to other allocated slices to clear the slice of the logical unit of data. In at least one embodiment, the evacuation process may transfer data from a lightly populated slice (e.g., a slice with only a few written blocks) to a more heavily populated slice (e.g., a slice with a few free/unwritten block spaces) such that the former lightly populated slice is completely free of data. Notably, this evacuation procedure designates these free slices as unavailable, which may not be requested for allocation by another logical unit.

In at least one embodiment of the current technique, slice relocation logic 452 may shift hot data slices of a logical volume to upper tiers and cold slices of the logical volume down to lower tiers. The goal of the slice relocation process is to put hot, frequently accessed data slices to higher tiers and maximize the utilization of these high tiers, which include faster but more expensive drives. I/O activity of a slice is an indicator of current I/O load of the slice. Slice I/O activity is computed using raw slice statistics. The computation may be done in any of several different ways. The specific computation to use may depend on the system I/O traffic pattern. In at least some cases, the simplest and most straightforward calculation is to use total slice I/O counts as I/O activity, such that the slice I/O load is the moving average of slice I/O counts.

In at least one embodiment of the current technique, slice relocation logic 452 migrates data from a portion of a storage pool to one or more slices of another portion of the storage pool in such a way that the data is spread efficiently across one or more RAID groups associated with the another portion of the storage pool in order to achieve better performance. Further, slices of the portion of the storage pool that store user data are migrated to another portion of the storage pool.

In at least one embodiment of the current technique, data placement logic 454 identifies a set of disk drives and/or RAID groups associated with a portion of a storage pool that is being reclaimed. Further, slice relocation logic 452 in conjunction with slice allocation table 450 identifies a set of slices associated with the set of disk drives and/or RAID groups. Slice relocation logic 452 relocates data from the set of slices to another portion of the storage pool. At the end of the data relocation, the set of disk drives are unbound, deallocated and becomes available as free disk drives. A user may be notified indicating that the set of disk drives may be replaced, removed or reconfigured. Further, during relocation of data from the set of slices, data placement logic 454 marks the set of slices as unavailable for new allocations such that data storage system 12 can not allocate a slice for storing data from the set of slices that are being reclaimed. Further, in at least one embodiment of the current technique, data placement logic 454 may verify before reclaiming a portion of a storage pool whether sufficient amount of free storage space is available in the storage pool to migrate data of the portion of the storage pool within the storage pool to different RAID groups. If sufficient amount of free storage space is not available in the storage pool, the portion of the storage pool may not be reclaimed.

It should be noted that, in at least one embodiment of the current technique, data placement logic 454 enables reclamation of a mapped LU which may include a thin logical unit that may be allocated by a user for provisioning storage, and a direct logical unit for which a slice is allocated by data storage system 12 instead of a user. Thus, data placement logic 454 enables reclamation of a logical volume irrespective of whether the logical volume may be visible to a user through a management interface.

Figure 8:
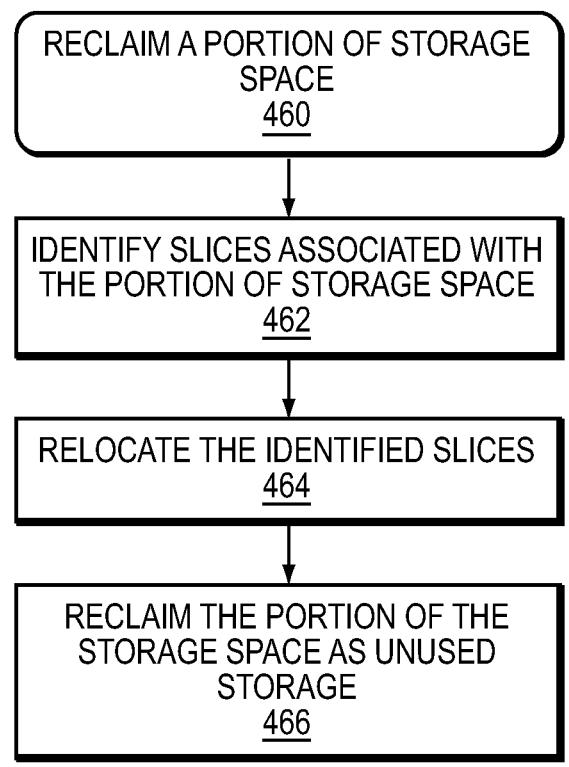
FIG. 8 is a flow diagram illustrating processes that may be used in connection with techniques herein.

Referring to FIG. 8, shown is a more detailed flow diagram illustrating managing logical volumes in data storage systems. With reference also to FIG. 7, a user identifies a portion of storage space of a storage pool that needs to be reclaimed as free or available storage space (step 460). The user may indicate the portion of storage space by specifying a storage entity such as a disk drive, and a RAID group associated with the portion of storage space. Data placement logic 454 identifies a list of slices associated with the portion of storage space and provides the information to slice relocation logic 452 (step 462). Further, data placement logic 454 prevents data storage system 12 to allocate a slice from the portion of storage space that is in a process of being reclaimed. Thus, when the list of slices is being processed by slice relocation logic 452, data storage system 12 can not allocate a slice from the list of slices upon receiving a request to allocate a new slice. Slice relocation logic 452 relocates data of the list of slices to other slices within the storage pool based on the characteristics of data and storage tiers in the storage pool (step 464). The portion of the storage space becomes available as free storage space which may optionally be removed or configured by the user (step 466).

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for use in managing data placement in storage systems, the method comprising:
    identifying a portion of a storage pool for reclaiming the portion as free storage in a data storage system, wherein the storage pool has been reserved for allocating storage upon receiving a storage allocation request, wherein the storage pool includes a set of logical volumes, wherein a logical volume of the set of logical volumes comprises a set of slices, each slice of the set of slices is a logical representation of a subset of physical disk storage;
    identifying a portion of physical disk storage associated with the portion of the storage pool identified for reclamation;
    identifying a set of slices associated with the portion of the physical disk storage in the data storage system;
    determining whether sufficient amount of free storage space is available in the same storage pool for relocating data of the set of slices of the storage pool;
    based on the determination, relocating data of the set of slices of the storage pool to another set of slices of the same storage pool in the data storage system based on characteristics of data and storage characteristics of the set of slices and the another set of slices of the storage pool, wherein the portion of the storage pool is reclaimed as free storage by avoiding relocating entire data of the storage pool to another storage pool;
    based on the relocation, avoiding allocating storage space from the set of slices upon receiving a new storage allocation request to use a storage space from the storage pool, wherein the new storage allocation request avoids allocating storage space from the set of slices being relocated;
    reclaiming the portion of the storage pool as free storage by removing the set of slices from the storage pool in the data storage system;
    reclaiming the portion of physical disk storage as free storage, wherein the portion of the physical disk storage includes a storage device; and
    reducing size of the storage pool based on the size of the portion of the physical disk storage reclaimed as free storage.

2. The method of claim 1, wherein an auto-tiering policy engine identifies the another set of slices in the storage pool for transferring data of the set of slices.

3. The method of claim 2, wherein the auto-tiering policy engine identifies the another set of slices based on temperature information of slices of the storage pool.

4. The method of claim 1, wherein the storage pool includes a set of storage objects, wherein a storage object of the set of storage objects includes a disk drive system comprising a plurality of Redundant Array of Inexpensive Disks (RAID) systems, each RAID system of the plurality of RAID systems having a first disk drive and a second disk drive.

5. The method of claim 1, wherein the portion of the storage pool is a disk drive comprising a plurality of Redundant Array of Inexpensive Disks (RAID) systems, each RAID system of the plurality of RAID systems having a first disk drive and a second disk drive.

6. The method of claim 1, wherein the set of slices is reclaimed as free slices.

7. The method of claim 1, wherein the storage pool includes a set of storage tiers.

8. A system for use in managing data placement in storage systems, the system comprising:
    a data storage system comprising a storage processor and a non-transitory computer-readable storage medium, wherein the storage processor is configured to:
    identify a portion of a storage pool for reclaiming the portion as free storage in the data storage system, wherein the storage pool has been reserved for allocating storage upon receiving a storage allocation request, wherein the storage pool includes a set of logical volumes, wherein a logical volume of the set of logical volumes comprises a set of slices, each slice of the set of slices is a logical representation of a subset of physical disk storage;
    identify a portion of physical disk storage associated with the portion of the storage pool identified for reclamation;
    identify a set of slices associated with the portion of the physical disk storage in the data storage system;
    determine whether sufficient amount of free storage space is available in the same storage pool for relocating data of the set of slices of the storage pool;
    based on the determination, relocate data of the set of slices of the storage pool to another set of slices of the same storage pool in the data storage system based on characteristics of data and storage characteristics of the set of slices and the another set of slices of the storage pool, wherein the portion of the storage pool is reclaimed as free storage by avoiding relocating entire data of the storage pool to another storage pool;
    based on the relocation, avoid allocating storage space from the set of slices upon receiving a new storage allocation request to use a storage space from the storage pool, wherein the new storage allocation request avoids allocating storage space from the set of slices being relocated;
    reclaim the portion of the storage pool as free storage by removing the set of slices from the storage pool in the data storage system;
    reclaim the portion of physical disk storage as free storage, wherein the portion of the physical disk storage includes a storage device; and
    reduce size of the storage pool based on the size of the portion of the physical disk storage reclaimed as free storage.

9. The system of claim 8, wherein an auto-tiering policy engine identifies the another set of slices in the storage pool for transferring data of the set of slices.

10. The system of claim 9, wherein the auto-tiering policy engine identifies the another set of slices based on temperature information of slices of the storage pool.

11. The system of claim 8, wherein the storage pool includes a set of storage objects, wherein a storage object of the set of storage objects includes a disk drive system comprising a plurality of Redundant Array of Inexpensive Disks (RAID) systems, each RAID system of the plurality of RAID systems having a first disk drive and a second disk drive.

12. The system of claim 8, wherein the portion of the a storage pool is a disk drive comprising a plurality of Redundant Array of Inexpensive Disks (RAID) systems, each RAID system of the plurality of RAID systems having a first disk drive and a second disk drive.

13. The system of claim 8, wherein the set of slices is reclaimed as free slices.

14. The system of claim 8, wherein the storage pool includes a set of storage tiers.

\* \* \* \* \*